(No Model.) 4 Sheets—Sheet 1.
L. ENGBERG.
WINDMILL APPARATUS.
No. 566,747. Patented Sept. 1, 1896.
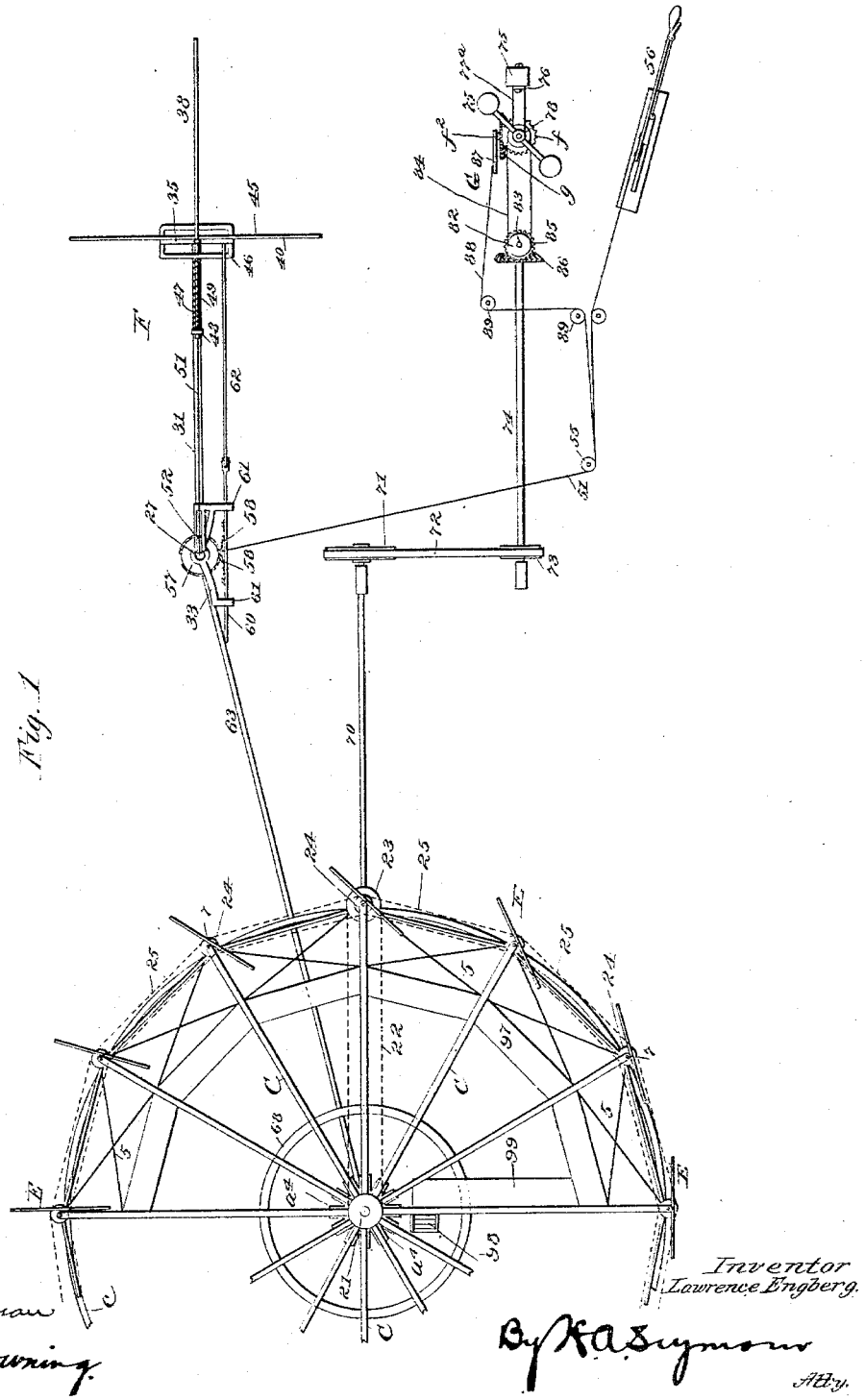
Witnesses.
J. F. Coleman
G. F. Downing
Inventor
Lawrence Engberg
By K. A. Seymour
Att'y.

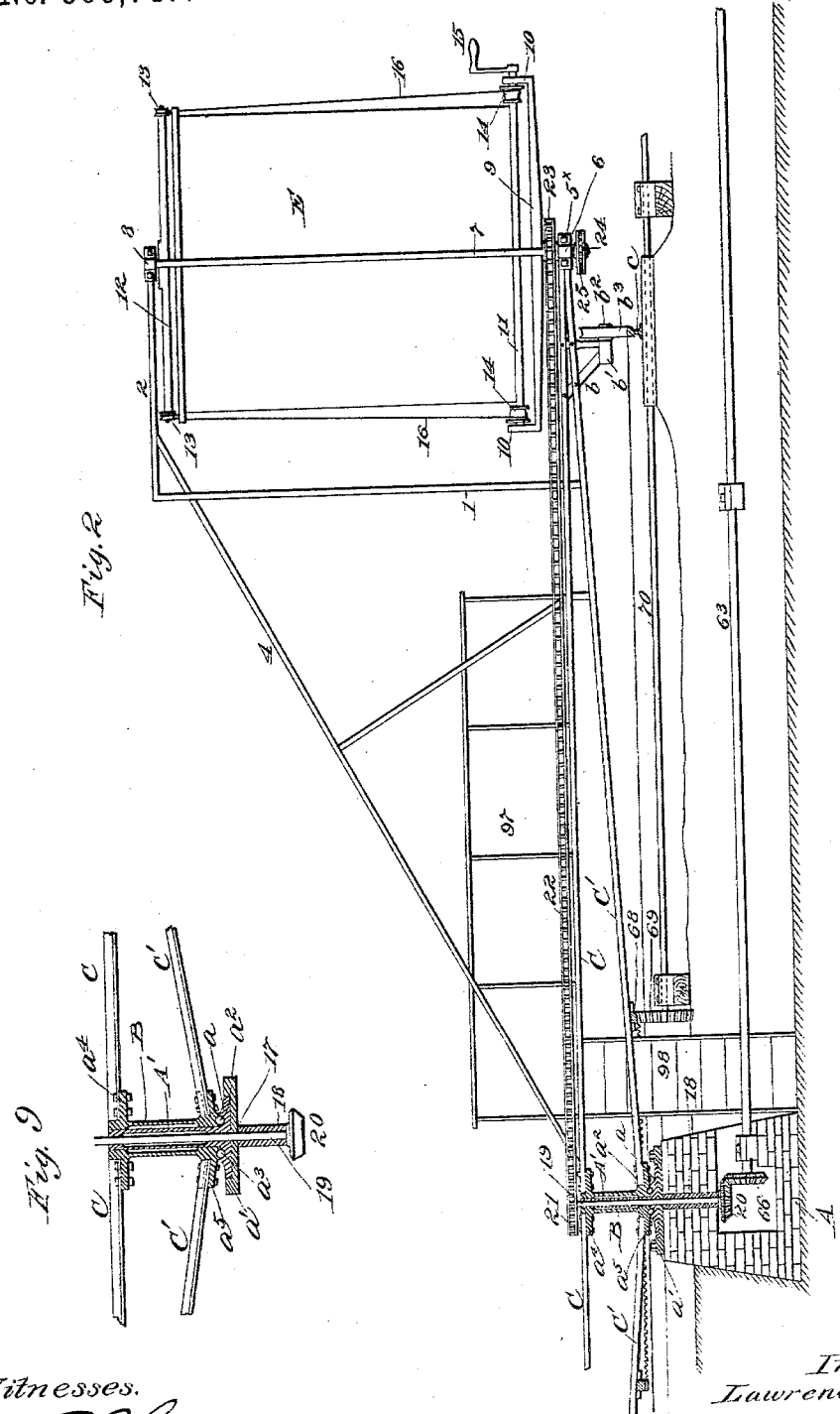

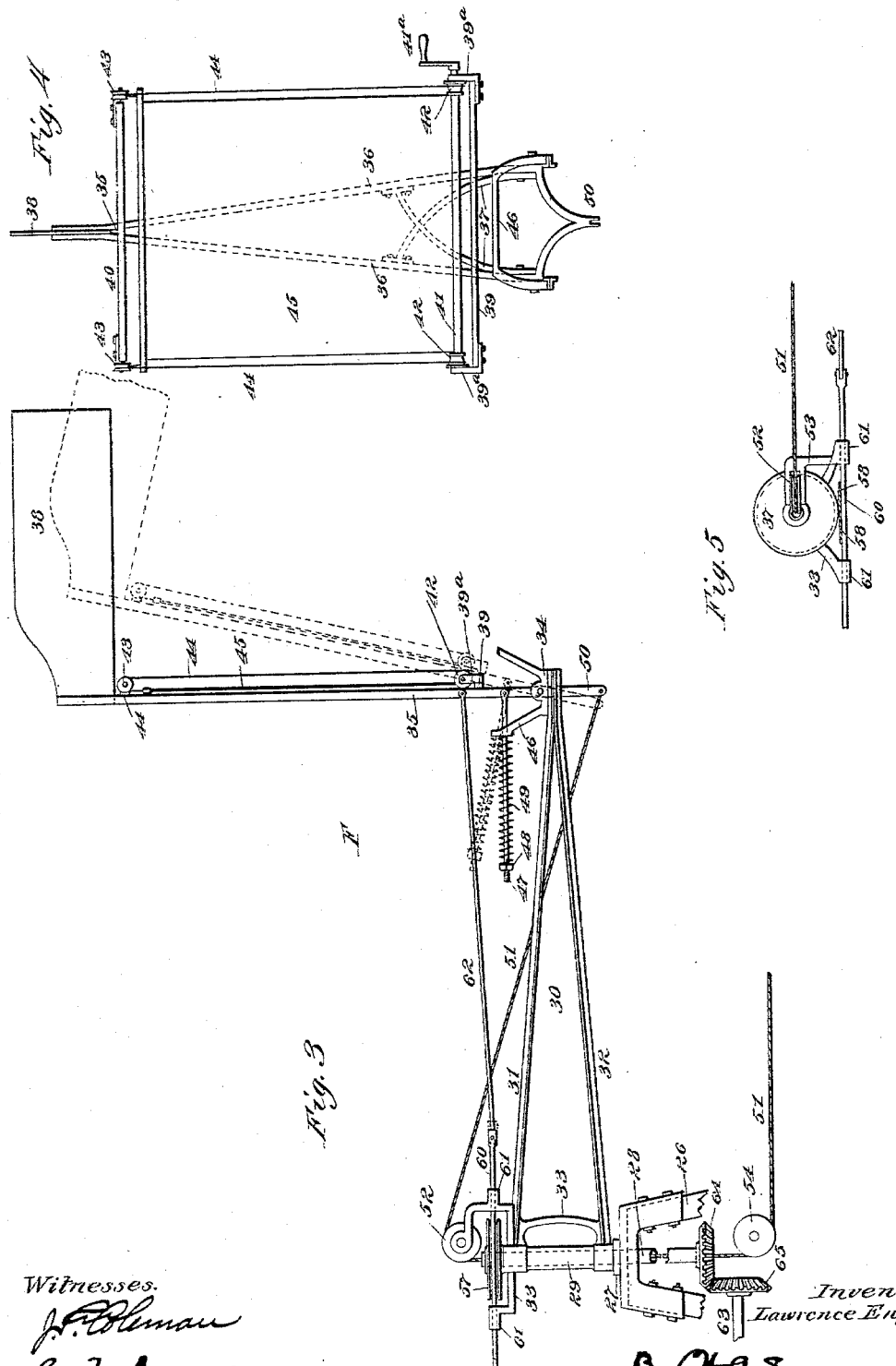

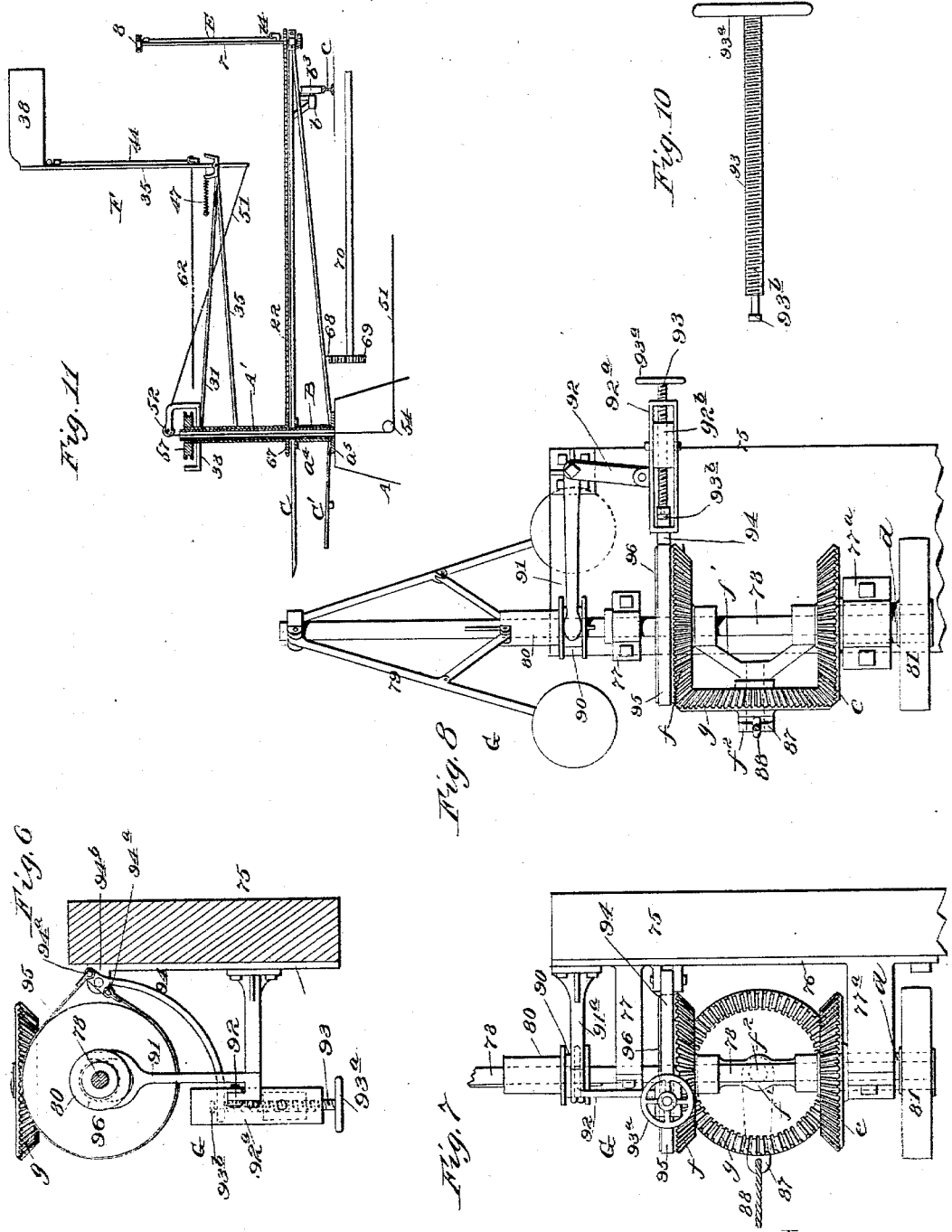

UNITED STATES PATENT OFFICE.

LAURENCE ENGBERG, OF BUTTE, NEBRASKA.

WINDMILL APPARATUS.

SPECIFICATION forming part of Letters Patent No. 566,747, dated September 1, 1896.

Application filed July 18, 1895. Serial No. 556,382. (No model.)

*To all whom it may concern:*

Be it known that I, LAURENCE ENGBERG, a resident of Butte, in the county of Boyd and State of Nebraska, have invented certain new and useful Improvements in Windmill Apparatus; and I do hereby declare the following to be a full, clear, and exact description of the invention, such as will enable others skilled in the art to which it appertains to make and use the same.

My invention relates to an improvement in windmills, its object being to produce a windmill which can be located on or in proximity to the ground, which shall be comparatively simple in construction, easy to manufacture and operate, and by means of which great power can be attained.

A further object is to provide a horizontal windmill with a regulator so constructed and arranged that it will swing with the wind when the direction of the wind shifts and to so connect the sails with the regulator as to cause the sails to change angles as the wheel revolves and made to stand at such angle to the wind that the wheel will be forced forward and the sail or sails moving against the wind made to present their edges thereto.

A further object is to so construct the regulator and connect it with the sails in such manner that when the wind increases in velocity the sails will be shifted so that their angle to the direction of the windmill will be reduced and thus cause a decrease in the power of the wheel.

A further object is to so construct the regulator that it can be readily adjusted to accommodate the mill to different velocities of the wind.

A further object is to construct the windmill in such manner that it will require but a comparatively small amount of wind to operate it.

A further object is to provide simple and efficient means whereby to increase or decrease the surface area of the sails to the wind.

A further object is to produce a windmill so constructed and arranged that when the velocity of the wind becomes excessive the mill will be automatically stopped or its speed decreased rather than increased.

A further object is to construct a windmill in such manner that it may be easily and quickly stopped or started by the operation of a suitable lever.

A further object is to provide framework for a horizontal windmill which shall be so braced that strain on the main central shaft or axle will be reduced to a minimum and the building of very large windmills of this class rendered practical.

A further object is to so construct a horizontal windmill that an operator or attendant can be upon the same when in operation.

A further object is to so construct a horizontal windmill that its motion can be readily reversed.

A further object is to provide a horizontal windmill with regulators so constructed and arranged that the velocity of the mill with respect to the force of the wind which drives it and also with respect to the increased, decreased, or varying load put upon it will be automatically governed.

With these objects in view the invention consists in certain novel features of construction and combinations and arrangements of parts, as hereinafter set forth, and pointed out in the claims.

In the accompanying drawings, Figure 1 is a plan view partly broken away. Fig. 2 is a side view of a portion of the machine, showing one of the sails and portions of the framework. Figs. 3, 4, and 5 are views illustrating the wind-regulator. Figs. 6, 7, and 8 are views illustrating the load-regulator. Fig. 9 is an enlarged detail in section of the pedestal, vertical shaft, and hub with connected radial arms and beams. Fig. 10 is an enlarged detached view of the screw 93. Fig. 11 is a view of a modification.

A represents a suitable pedestal, on which a hollow vertical shaft A' is located, said shaft being made at its lower end with a flange $a$, and the latter being seated on a suitable base-plate $a'$, securely bolted to the pedestal. A hub B is mounted on the shaft A and its lower end recessed for the accommodation of antifriction-balls $a^2$, on which said hub bears, said balls being supported in an annular groove $a^3$ in the flange $a$. The hub B is provided at its upper end with a flange $a^4$, to which a series of radiating arms C are secured and constitute a portion of the framework of the wind-wheel. The hub B is also provided at its lower end with flanges $a^5$, to which one end of a series of radiating bracing-beams C' are secured, said beams being disposed under the arms C and at their outer ends are secured to the free extremities of the arms, the said arms C and the bracing-beams C' constituting the spokes of the wind-wheel. To said spokes at points removed somewhat inwardly from their outer ends depending brackets $b$ are secured and made at their lower ends with horizontal journal-boxes $b'$ for the reception of the axles $b^2$ of wheels $b^3$, and the latter will be made to run upon an annular track $c$, mounted on suitable ties disposed on the ground. Posts or uprights 1 are secured at their lower ends to the spokes C at points inwardly removed from the free ends thereof a distance somewhat greater than half the width of the proposed sails to be mounted on said spokes, and said posts or uprights extend upwardly a distance somewhat greater than the height of the sails. To the upper ends of the posts or uprights 1 arms 2 are secured and made to project outwardly parallel with the spokes C, and the series of arms 2 are connected together and braced by means of a series of crossed braces or truss-rods 5. The posts or uprights 1 and arms 2 are also braced by means of a series of diagonally-disposed truss-rods 4, secured at their upper ends to said posts or uprights and arms, and at their lower ends to the spokes C in proximity to the inner ends of the latter. The outer ends of the spokes C, the posts or uprights 1, and the outwardly-projecting arms 2 constitute a sort of framework in which sails E are mounted in a manner now to be explained. An arm or bracket $5^\times$ is secured to the free end of each spoke C and provided with a vertically-disposed journal-box 6 for the accommodation of the vertical shaft 7 of the sail, said shaft also having its bearing in a journal-box 8, secured to the outwardly-projecting arm 2. A bar 9 is secured centrally between its ends to each vertical shaft 7 and provided at its ends with upwardly-projecting arms 10, in which a shaft 11 is mounted, on which shafts the sails E are adapted to be wound. A bar 12 is secured centrally between its ends to each shaft 7 at the upper end thereof, and to the ends of each bar 12 pulleys 13 are mounted. On each shaft 11 drums 14 14 are secured in proximity to the ends thereof, and each shaft 11 is provided at one end with a crank-arm 15, by which to turn the same. Cords or chains 16 16 are wound on the drums 14 and extended up over the pulleys 13 and their ends secured to the upper edge of the sail E. From this construction and arrangement of parts it will be seen that the surface area of the sails exposed to the wind can be readily increased or diminished by turning the shafts 11 to raise or lower the sails.

The base-plate $a'$ is made with an opening 17 in line with the vertical shaft $A'$, and below said base and in line with the opening therein and the vertical shaft $A'$ a sleeve 18 is disposed.

A shaft 19 is mounted in the hollow vertical shaft $A'$ and sleeve 18, and to its lower end a bevel-pinion 20 is secured, to which motion will be imparted by means of a wind regulator or governor F, presently explained. The upper end of the shaft 19 is provided with a sprocket-wheel 21, over which a sprocket-chain 22 passes, said chain also passing over a sprocket-wheel 23, secured to the shaft 7 of one of the sails. The shaft 7 of each sail is provided with a fixed sprocket-wheel 24, and a sprocket-chain 25 encircles the entire wind-wheel, meshing with said sprocket-wheels 24. Under normal conditions—viz., when the velocity of the wind is constant or unvarying—the shaft 19 and the sprocket-wheel 21 carried thereby will be held fixed by the wind regulator or governor F hereinbefore referred to. Therefore as the wind-wheel revolves motion will be imparted from said sprocket-wheel 21 to the sprocket-wheel 23 on the shaft 7 of one of the sails by means of the sprocket-chain 22, and as the shafts 7 of all the sails are geared together in the manner above described this motion will be transmitted to all the sails, so that as the wheel revolves the sails will be gradually turned, some of the sails being thus continuously presented to the action of the wind—viz., at an angle to the direction of movement of the wind—while the other sails are made to pass edgewise through the wind.

In order to vary the angle of the sails to the wind as the latter increases or decreases in velocity, and thus insure the regularity and uniformity of running of the mill, the regulator or governor F is employed, and with the said regulator or governor other mechanism is connected, by means of which to normally control the speed of the wheel and its direction of rotation, the construction and operation of which regulator or governor and controlling mechanism will now follow.

While my improved wind regulator or governor may be located close to the ground on a suitable pedestal of masonry, I prefer to place it upon a tower 26, the height of which may vary according to the lay of the land where the apparatus is built, and the distance of the regulator or governor from the wind-wheel is not a matter of much importance. In fact, the regulator may be on the wind-wheel itself, as hereinafter explained. On the tower 26 a journal-bearing 27 is secured for the accommodation of a hollow vertical shaft 28, which extends above and below said journal-bearing. The upper portion of the shaft 28 passes loosely through a hub or sleeve 29, mounted on the tower, and from the said hub or sleeve an arm 30 projects laterally, said arm comprising two members 31 32, secured at their inner ends to a bracket 33, made fast to the hub or sleeve 29, and at their free ends said members 31 32 are secured together and support a base-plate 34, to which a standard 35 is pivotally connected, and said standard is preferably made V-shaped and its two parts 36 36 connected together at their lower ends by suitable braces 37.

To the upper end of the standard 35 a vane 38 is secured and adapted to maintain the regulator in line with the direction of the wind. A cross-bar 39 is secured between its ends to the standard 35, near the lower end thereof, and a similar cross-bar 40 is secured to the standard near its top. The ends of the bar 39 are made with upright arms 39$^a$, in which a shaft 41 is mounted, said shaft being provided at one end with a crank-arm 41$^a$, by which to turn it. Drums 42 are secured at their respective ends of the shaft 41, and to ends of the cross-bar 40 pulleys 43 are mounted. Cords 44 are wound on the drums 42, and, after passing over the pulleys 43, are attached to the upper edge of a sail or curtain 45, the latter being adapted to be wound upon and unwound from the shaft 41 by turning the shaft 41, and thus expose a greater or less area of the surface of the sail or curtain 45 to the action of the wind. An arm or yoke 46 projects from the base-plates 34 and serves as a bearing for a horizontally-disposed rod 47, one end of which is pivotally connected to the standard, and the other end of said rod, which projects some distance laterally from the standard, is screw-threaded for the reception of a nut 48. On said rod 47, between the arm or yoke 46 and the nut 48, a spring 49 is located and adapted to maintain the standard and the sail or curtain carried thereby in a normally vertical position, said spring being adjusted to withstand a predetermined pressure against the sail 45 without moving the standard on its fulcrum by means of the nut 48. The standard 35 is provided with an arm 50, which depends below the fulcrum thereof, and to the free end of said arm a cord 51 is attached. The cord 51 passes over a pulley 52, mounted in an arm 53 on the bracket 33, then down through the hollow shaft 28, then about a pulley 54, then over a pulley 55, and the end of said cord is attached to a pivoted lever 56, by the operation of which the standard 35 can be manually turned on its fulcrum, whereby to change the angle of the sails E to the wind through the medium of mechanism which will now be explained. A grooved wheel or drum 57 is secured to the upper end of the hollow shaft 28 and has secured thereto two short sections of rope or other flexible material 58 58, which are secured at their ends to said wheel or drum and partially encircle the same. The ropes 58 58 extend from the wheel or drum 57 in opposite directions and at their outer ends are secured to a bar 60, adapted to reciprocate in arms 61, projecting from the bracket 33. To one end of the reciprocatory bar 60 one end of a rod 62 is pivotally connected, and the other end of said rod is pivotally connected to the standard 35, so that when the latter turns on its fulcrum the bar 60 will be reciprocated and the shaft 28 partially rotated through the medium of the flexible connections 58 and wheel or drum 57. The partial rotation thus imparted to the hollow shaft 28 will be transmitted to a shaft 63 through the medium of bevel-pinions 64 65, carried by the respective shafts, and the shaft 63 may, if desired, be located in a trench in the ground. The shaft extends to the center of the wind-wheel, where it is provided with a bevel-pinion 66, adapted to mesh with and transmit motion to the bevel-pinion 20 at the lower end of the hollow vertical shaft 19.

As before mentioned, under normal conditions the shaft 19 will be held stationary, so that the maximum angle of the sails E to the action of the wind will be maintained uniform; but it is evident that should the velocity of the wind increase sufficiently to overcome the resistance offered by the spring 49 the standard 35 will be caused to turn on its fulcrum and transmit motion (in the manner above explained) to the vertical shaft 19, from which latter motion will be imparted to the shafts 7 of the sails and cause the latter to turn, so as to reduce the maximum angle of said sails to the action of the wind, and thus prevent the increased velocity of the wind from causing the speed of the wheel. Should the velocity of the wind become excessive, as in case of a hurricane, the standard of the wind regulator or governor F will be turned on its fulcrum far enough to cause a sufficient rotation of shaft 19 to cause the sails E to be turned and disposed in such position as not to be affected by the wind, and consequently the wheel will under such conditions be brought to a standstill.

It is evident that by operating the lever 46 the sails can be so moved as to cause the wheel to stop, or the sails may be turned sufficiently far by operating lever 46 to cause the wheel to rotate in the reverse direction.

When the wind regulator or governor F is placed on the wind-wheel instead of on a tower, the shaft 19 and gearing connected therewith will be dispensed with. The stationary hollow shaft A' will be extended above the hub of the spokes C (see Fig. 11) and a sprocket-wheel 67 (corresponding to sprocket-wheel 21) may be mounted loosely on said shaft A' or a contracted extension thereof, if desired, and over said sprocket-wheel 67 the sprocket-chain 22 is passed. The wind-regulator will be mounted loosely on the shaft A', the grooved wheel or drum 57 mounted to rotate with the sprocket-wheel 67, and the hollow shaft A' also utilized for the passage of the cord 51.

In order to transmit power from the wind-wheel, the latter may be provided with an annular rack-bar 68, adapted to mesh with and transmit motion to a pinion 69, carried by a driving-shaft 70. A band-wheel 71 may be secured to the other end of the main driving-shaft 70 for the reception of a band or belt 72, which latter also passes over a similar band-wheel 73 on a counter-shaft 74, and said counter-shaft is extended to and adapted to drive the mechanism to be operated. Not only will the varying velocity of the wind cause the wind-wheel to run irregularly, if some means be not provided to obviate the same, but the irregularity of the load on the mill will also prevent the steady and uniform running of the apparatus. To obviate this and insure the regular and uniform running of the wheel at the desired rate of speed, regardless of the irregularity of the load on the wheel, I provide mechanism which I will term a "load" regulator or governor G. The regulator or governor G will preferably be supported by a post 75, suitably disposed with respect to the wind-wheel, the wind-regulator, and the operating-lever 56. To the post 75 a bracket 76 is secured and made with arms 77 77$^a$, in the ends of which a vertical shaft 78 is mounted and made of sufficient length to project some distance above the post. To the upper end of said shaft 78 a centrifugal governor 79 is attached, and the weighted arms of this governor are connected with a sleeve 80, mounted loosely on the shaft 78.

The lower end of the shaft 78 is mounted in a short tubular shaft or sleeve $d$, and the latter is mounted in the journal-bearing at the end of arm 77$^a$. To this short shaft or sleeve a bevel-gear $e$ is secured. A bevel-gear $f$ is also secured to the shaft 78. A bracket $f'$ is mounted loosely on the shaft 78 between the gears $e f$, and from said bracket a pintle $f^2$ projects. On this pintle a bevel-gear $g$ is mounted and adapted to mesh with the gears $ef$. A pulley 81 is secured to the lower end of the hollow shaft or sleeve $d$ and receives motion from a pulley 82, carried by a vertical shaft 83, by means of a belt 84. The lower end of the shaft 83 is provided with a bevel-gear 85, to which motion is imparted by a bevel-gear 86 on the counter-shaft 74. An arm 87 is attached to the pintle $f^2$ and made of a length sufficient to project beyond the periphery of the gear $g$. To the free end of this arm one end of a cord or rope 88 is attached. From its attachment to the arm 87 the rope or cord 88 may be passed over suitable pulleys 89, and at its opposite end is attached to the rope or cord 51 at a point between the operating-lever 56 and the wind-governor F. Motion being imparted to the centrifugal governor 79 and the intermediate gears $e f g$ from the main driving-shaft of the apparatus, it will be seen that should a portion of the load on the wind-wheel be suddenly removed the speed of the wheel would tend to increase in proportion to the amount of the load removed. This increase of speed would of course be transmitted to the centrifugal governor 79 and the gears $e f g$ and cause the gear $g$ to have a movement concentric with the shaft 78 of the governor. When the gear thus moves, it will cause the arm 87 to pull on the cord 88, and the latter being connected with the cord 51 the standard 35 of the wind-governor E will be turned on its fulcrum and motion transmitted, through the medium of the mechanism hereinbefore described, to the sails, whereby to turn them so as to reduce their angle to the wind and reduce the speed of the wheel to compensate for the load removed from the wheel. To afford additional means for insuring the perfect regulation of the wheel with respect to the load, I provide devices which will now be explained.

The sleeve 80 is connected with the weighted arms of the centrifugal governor, as above explained, and is provided with a collar 90 for the reception of one arm of an L-shaped lever 91, which latter is pivoted to a lug 91$^a$ on an arm of bracket 76. The depending arm 92 of the lever 91 is secured to a slotted block 92$^a$, within which a nut 92$^b$ is pivotally supported. Through the nut 92$^b$ a screw 93 is passed and provided at one end with a wheel 93$^a$, by means of which to turn it. The other end of the screw 93 is made with a head 93$^b$, loosely connected with one end of a curved lever 94. The other end of the lever 94 is made with short laterally-projecting arms 94$^a$, between which said lever is pivoted to an arm 94$^b$, projecting from the bracket 76. To the arms 94$^a$ the respective ends of a steel brake-band 95 are connected, said brake-band passing around a brake-wheel 96, made integral with the bevel-gear $f$. From this construction and arrangement of parts it will be seen that when the amount of load removed from the apparatus is excessive, so as to cause the wheel and the centrifugal governor to revolve quite rapidly and the weighted arms of the governor to be thrown out some distance, the sleeve 80 will be raised, causing the levers 91 94 to be turned on their fulcrums and the brake-band 95 tightened on the brake-wheel 96, thus retarding the rotation of the latter. When the bevel-gear $f$ (made integral with the brake-wheel) is thus retarded, the gear $g$ will be caused to move farther around the shaft 78, and thus cause a greater pull on the rope 88, the result of which will be to reduce the angle of the sails to the wind sufficiently to cause a reduction of speed of the wheel commensurate with the large load suddenly removed.

By adjusting the screw 93 the governor may be made to actuate the brake device when the wheel shall have reached a certain predetermined speed.

By the use of the two governors F G the apparatus can be run regularly and evenly at any desired rate of speed.

It is desirable that a platform 97 be placed on the wind-wheel for the accommodation of an attendant who may be stationed on the wheel when the latter is in operation. Steps 98 may be provided for mounting the wheel, and from said steps a platform 99 extends outwardly to the platform 97.

Numerous slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. In a windmill, the combination with a horizontal wind-wheel and revoluble sails thereon, of a regulator comprising a pivoted standard, a vane carried by said standard, and gearing between said standard and the revoluble sails whereby a movement of said standard will cause a change of angle of the sails, substantially as set forth.

2. In a windmill, the combination with a horizontal wind-wheel and a series of revoluble sails carried thereby, of a laterally-projecting swinging arm, a standard pivoted to the free end of said arm, a vane secured to the standard, a curtain carried by the standard, and gearing between said standard and revoluble sails, substantially as set forth.

3. The combination with the revoluble sails of a horizontal windmill, of a swinging arm, a standard pivoted to the end of said arm, a vane secured to said standard, an adjustable curtain carried by the standard at an angle to the vane, and gearing between said standard and the revoluble sails, substantially as set forth.

4. The combination with the revoluble shafts of a horizontal windmill, of a swinging arm, a standard pivoted to the free end of said arm, a vane secured to the standard, a curtain carried by the standard, an adjustable spring for maintaining the standard in a normal position, gearing between said standard and the revoluble sails, and means for manually moving said standard whereby to change the angle of the sails to the wind, substantially as set forth.

5. In a wind-governor for a windmill, the combination with a hollow shaft, of an outwardly-projecting arm mounted thereon, a standard pivoted to said arm, a vane and curtain carried by said standard, gearing for imparting the movements of the standard to the sails of the wind-wheel, an adjustable spring for maintaining the standard in a normal position, an operating-lever, and a cord connected at one end to said lever and passing through said hollow shaft, the other end of said cord being attached to the lower end of said standard, substantially as set forth.

6. In a windmill-regulator, the combination with a vertical shaft and an arm mounted thereon, of a pivoted standard at the end of said arm, a vane and a curtain carried by said standard, an adjustable yielding device for maintaining the standard in a normal position, a grooved wheel carried by said shaft, a longitudinally-movable bar, ropes extending in opposite directions from said grooved wheel and secured to said longitudinally-movable bar, and a connection between said bar and the pivoted standard, substantially as set forth.

7. The combination with a horizontal wind-wheel, a series of sails thereon, and a driven shaft geared with the wheel, of an epicyclic train of gears, a centrifugal governor connected therewith, gearing connected with said revoluble sails, and connections between said gearing and the traveling gear of the epicyclic train whereby when the load on the wheel is decreased the angle of the sails to the wind will be reduced so as to reduce the speed of the wheel, substantially as set forth.

8. The combination with the revoluble sails of a horizontal wind-wheel, of an epicyclic train, gearing connected with said sails, connections between said gearing and the traveling gear of said epicyclic train, a centrifugal governor connected with the latter and a brake actuated by said governor and connected with one of the gears of said train, and means for driving the said train, substantially as set forth.

9. In a windmill, the combination with a wheel having revoluble sails, and a driven shaft, of an epicyclic train geared with the latter, means for connecting the traveling gear of said train with the sails whereby to turn them when the load on the wheel is reduced, a centrifugal governor connected with said train, a brake-wheel on one of the gears of the train, a pivoted lever actuated by the governor, a block secured to said lever, a pivoted nut in said block, a screw passing through said nut, a pivoted lever connected at one end to said screw, and a band passing about said brake-wheel and attached at its ends to said last-mentioned pivoted lever at opposite sides of the fulcrum of the latter, substantially as set forth.

In testimony whereof I have signed this specification in the presence of two subscribing witnesses.

LAURENCE ENGBERG.

Witnesses:
J. A. McLAUGHLIN,
DAVIS W. FORBES.